United States Patent [19]

Thillier et al.

[11] 4,153,781

[45] May 8, 1979

[54] METHOD OF PRODUCING POLYESTERS

[75] Inventors: Robert Thillier, Feyzin; Yves Vaginay, Lyons, both of France

[73] Assignee: Rhone-Poulenc-Textile, Paris, France

[21] Appl. No.: 885,335

[22] Filed: Mar. 10, 1978

Related U.S. Application Data

[63] Continuation of Ser. No. 325,343, Jan. 22, 1973, abandoned.

[30] Foreign Application Priority Data

Jan. 24, 1972 [FR] France .......................... 72.02493

[51] Int. Cl.$^2$ ...................... C08G 63/38; C08G 63/34
[52] U.S. Cl. ................... 528/274; 528/279; 528/309
[58] Field of Search ............... 528/279, 274, 308, 309

[56] References Cited

U.S. PATENT DOCUMENTS

| | | | |
|---|---|---|---|
| 3,475,379 | 10/1969 | Hilaire | 260/75 R |
| 3,523,923 | 8/1970 | Smith et al. | 260/75 R |
| 3,565,864 | 2/1971 | Girantet | 260/75 R |
| 3,644,293 | 2/1972 | Fielder | 260/75 R |
| 3,651,014 | 3/1972 | Witsiepe | 260/75 R |

*Primary Examiner*—Walter C. Danison
*Attorney, Agent, or Firm*—Stevens, Davis, Miller & Mosher

[57] ABSTRACT

New method of manufacturing polyesters and copolyesters having a base of aromatic diacids and condensation diols having at least 3 carbon atoms.

This method, carried out in the presence of an organic titanium derivative, by transesterification between an alkyl ester of the aromatic diacid and the diol, and then polycondensation, is characterized by the addition, during the polycondensation stage, of 0.001 to 1% by weight of a nonvolatile amine, based on the weight of polymer.

The polymers obtained may be transformed into threads, fibers, films or molded objects.

7 Claims, No Drawings

METHOD OF PRODUCING POLYESTERS

This is a continuation of application Ser. No. 325,343 filed Jan. 22, 1973, now abandoned.

This invention relates generally to polyesters and more particularly to polyesters prepared by esterifying dicarboxylic acids and diols.

Synthetic polyesters obtained from dicarboxylic acids and diols which can be used in making textile products are well known. Among them the most common are obtained from an aromatic dicarboxylic acid and a diol of the formula HO—$(CH_2)_n$—OH in which n is a whole number between 2 and 10. One of the methods of preparing such polyesters involves transesterification in the presence of a polycondensation catalyst to produce the polyester with elimination of the excess diol.

Such a process has certain disadvantages. A large amount of diol, usually at least two mols per mol of ester produced, is required. This requires at the start of the reaction a reactor of substantial volume and a large source of heat. It is also necessary to recycle the excess diol formed during the polycondensation with all the expenditure of energy which this requires. A transesterification catalyst, generally a metal salt such as zinc, manganese, calcium or cobalt acetate or the like is required. Such a catalyst generally leads to discolorations or degradation reactions during the subsequent use of the polyester. Moreover, secondary reactions occur because of the dehydration of the diol. Such secondary reactions are greater the higher the molar ratio. Also, a second catalyst must be used in the polycondensation reaction. Such catalysts may be derivatives of antimony, litharge and the like.

One known variant is that in which the customary mineral polycondensation catalyst is replaced by triethanolamine, introduced in very small amount, which leads to colorless polymers (French Pat. No. 1,490,477).

Another known variant of this process consists in using one and the same catalyst for the transesterification and the polycondensation reactions, such as organic derivative of titanium of the type $Ti_xO_{2x+2}R_y$, for instance, R being any mono- or polyvalent radical (French Pat. No. 1,153,698).

In this latter case, the diol/ester molar ratio of the aromatic diacid can be greatly decreased, the polycondensation reaction starting well before the end of the interchange of the alcohols. Molar ratios close to 1 can be used, which, of course, represents a substantial economic advantage.

Unfortunately, in this process it is not possible to "block" the interchange catalyst as is customarily done for metal salts with a phosphorus compound since this blocking would obviously result in a slowing down or even an inhibiting of the polycondensation reaction itself.

It is therefore necessary to leave the organotitanium catalyst free through the entire transesterification-polycondensation reaction.

Due to the absence of the blocking agent, the polymers obtained are of extremely poor heat stability. Upon the pouring out of the contents of the autoclave, a substantial decrease in viscosity is observed between the start and the end, which leads to a heterogeneous polymer. Furthermore, the drying and remelting, which are indispensable for the subsequent shaping, cause a strong degradation and therefore lead to greatly decreased mechanical properties on the part of the finished article.

It is therefore an object of this invention to provide a process for making polyesters which is devoid of the foregoing disadvantages. Another object of the invention is to provide an improved process for making polyesters of aromatic dicarboxylic acids and glycols by transesterification and polycondensation. Still another object of the invention is to provide a novel and improved polycondensation step in the preparation of polyesters of aromatic dicarboxylic acids and glycols.

The foregoing objects and others are accomplished in accordance with this invention, generally speaking, by providing a method for manufacturing a polyester having a base of an aromatic dicarboxylic acid and a condensation glycol wherein an alkyl ester of the aromatic acid and a glycol having at least three carbon atoms and preferably up to 10 carbon atoms are transesterified in the presence of an organic titanium compound and then polycondensed in the presence of from about 0.001% to 1% by weight of a non-volatile amine based on the weight of polymer to be formed. The polyester may be a copolyester prepared from a plurality of aromatic dicarboxylic acids and/or glycols.

The presence of such an amine permits a decrease in the time required by the transesterification-polycondensation cycle, the customary concurrent degradation reactions upon the working up of the polymer being strongly inhibited; it acts as a very effective procretor from the degradation caused by the organic titanium derivative; the latter may be selected from among alkyl titanates, orthotitanates or polytitanates.

Any suitable nonvolatile amine having a boiling point of more than about 200° C. at atmospheric pressure may be used in practicing the pressure invention. For example, dibenzylamine dietylamine, triethanolamine, trioctylamine, tribenzylamine, and benzyldiethanolamine may be used.

The process of the present invention may be carried out in the presence of a polyfunctional branching agent or of an adjuvant such as a branching agent such as titanium oxide or a coloring agent such as pigments or colorants, if desired.

The polyesters thus prepared have a uniform viscosity in the molten state. Contrary to ethylene glycol polyterephthalate in which the formation of aldehyde products leads to undesirable discolorations in the presence of an amine, the colorimetric characteristics of such polymers are excellent due to the decrease of the polycondensation times. No degradation has been found upon drying and remelting them in use; therefore, good mechanical properties and heat resistance, resistance to oxidation and hydrolysis of the products are obtained.

The general conditions of preparation are as follows:

Into a stainless steel autoclave provided with an agitator and means for placing under vacuum and regulating, there are introduced the diester or diesters of the diacid or diacids, the diol or diols and the catalyst; the temperature is progressively increased until the end of the interchange of the alcohols; when this phase of operation is complete, the nonvolatile amine is introduced in a proportion such that its concentration is between 0.001 and 1% by weight, namely 10 to 10,000 parts per million (ppm) in the final polymer; more particularly, this amine can be placed in solution in the diol possibly containing titanium oxide in suspension. The polycondensation is then continued under a vacuum of the order of 1 mm Hg, the temperature being gradually increased to a value which may be between 250° C. and 300° C. When the viscosity in molten state of the polymer has reached the desired value, it is poured into water, granulated and dried.

The following examples, in which the parts are expressed by weight, are given by way of illustration and not of limitation in order to illustrate the invention. In these examples:

the viscosity in molten state of the polymer (MV) expressed in poises is determined on a Davenport extrusion plastometer, the viscosity index (VI), equal to 1000 ($\eta_r$-1/c), is measured at 25° C. on a 1% solution in weight per volume of polymer in o-chlorophenol, the concentration (C) being expressed in g/l.

the degradability of the polymer is evaluated by measuring the viscosity in molten state before ($MV_1$) and after ($MV_2$) a treatment under nitrogen for 30 min. at a temperature of 250° C. or 260° C., depending on the polymer, and therefore $\Delta MV = MV_1 - MV_2$, the determination of the number of —COOH terminal groups per ton of polymer (GT) is effected by colorimetric determination, luminance (Y%) and yellow index (YI) are measured on an Elrepho (Zeiss) photocolorimeter by the method described in the second edition of Kirk-Othmer's Encyclopedia of Chemical Technology (John Wiley, 1964), Vol. 5, pages 802 to 805.

EXAMPLE 1

In a first test, 2910 parts of dimethyl terephthalate, 1530 parts of butanediol-1,4 and 0.66 part of triethanolamine orthotitanate are introduced simultaneously into the autoclave. The interchange of the alcohols commences at 160° C.; simultaneously with the distillation of the methanol, at the end of an hour, the pressure is progressively lowered to 300 mm Hg in fifty minutes and maintained at this value for one hour; the temperature of the mass is then 220° C. After having broken the vacuum with nitrogen, 66 parts of a 20% by weight butanediol suspension of $TiO_2$ containing 0.66 part of triethanolamine orthotitanate are added. The pressure is rapidly restored to 300 mm Hg. A vacuum of 0.5 mm Hg is then applied in 45 min., while the mass is brought to 260° C. The polycondensation is continued for 1½ hour, whereupon the polymer is poured.

In a second test, carried out in accordance with the same procedure, the butanediol suspension of $TiO_2$ contains not only the titanium oxide and the second fraction of the polycondensation catalyst, but also 1.65 parts of benzyldiethanolamine, which amount corresponds to 500 ppm, referred to the polymer.

The following table gives the value of viscosity in molten state of these two polymers and shows that the initial value of Test 2 is higher than that of Test 1 and that the degradation in molten state in this latter test is far greater.

| Test No. | $MV_1$ (at 260° C.) | $MV_2$ (after heat treatment at 260° C). | MV |
|---|---|---|---|
| 1 | 3,160 | 2,300 | 860 |
| 2 | 3,650 | 3,500 | 150 |

EXAMPLES 2, 3, 4

In a control test, 2910 parts of dimethyl terephthalate, 1530 parts of butanediol-1,4 and 0.66 part of triethanolamine orthotitanate are introduced simultaneously into the autoclave. The interchange of the alcohols commences at 160° C.; simultaneously with the distillation of the methanol, at the end of an hour, the pressure is gradually lowered to 300 mm Hg in fifty minutes and maintained at this value for one hour; the temperature of the mass is then 220° C. After having broken the vacuum with nitrogen, 66 parts of a 20% by weight butanediol suspension of $TiO_2$ containing 0.66 part of triethanolamine orthotitanate are added. The pressure is rapidly restored to 300 mm Hg, whereupon a vacuum of 0.5 mm Hg is progressively applied in 45 min.; the polycondensation is continued until the power absorbed by the agitation is at its maximum. The pouring takes about 50 min.

In the examples, the triethanolamine is introduced into the butanediol suspension at different rates.

The results obtained are set forth in the following table:

| Example | Proportion of triethanolamine in ppm/polymer | $MV_1$ | $MV_2$ | GT —COOH | Y% | YI |
|---|---|---|---|---|---|---|
| Control | 0 | 4,450 | 3,820 | 53 | 73.7 | 18 |
| 2 | 100 | 6,150 | 4,960 | 50 | 72.6 | 20 |
| 3 | 200 | 6,450 | 5,460 | 46 | 70.4 | 23 |
| 4 | 500 | 7,100 | 6,500 | 43 | 73.9 | 15 |

$MV_1$ represents the viscosity in poises of the polymer at 260° C. after pouring five minutes.
$MV_2$ represents the viscosity in poises of the polymer at 260° C. after forty-five minutes of pouring.

An examination of the values of this table shows that the resistance of the polymer of degradation increases with the amount of triethanolamine introduced.

EXAMPLE 5

In a first test, 29,100 parts of dimethyl terephthalate, 15,300 parts of butanediol-1,4 and 6.6 parts of triethanolamine orthotitanate are introduced into an autoclave; the interchange of the alcohols commences at 160° C.; at the end of two hours and fifteen minutes, the theoretical amount of methanol is distilled off. The temperature of the mass reaches 245° C. Thereupon 660 parts of a 20% by weight butanediol suspension of titanium oxide and 6.6 parts of triethanolamine orthotitanate are added. The pressure is lowered in forty minutes to one mm Hg, while the mass is brought to 260° C. The polycondensation is continued for fifty-five minutes at this temperature. The polymer is then poured.

In a second test, the butanediol suspension furthermore contains 33 parts of trioctylamine.

The characteristics of the two polymers obtained are given in the following table:

| Test No. | $MV_1$ (260° C.) | VI |
|---|---|---|
| 1 | 3,600 | 117 |
| 2 | 4,200 | 120.5 |

EXAMPLE 6

1940 parts of dimethyl terephthalate, 1298 parts of hexanediol-1,6, and 2 parts of butyl polytitanate are introduced into an autoclave; the interchange of the alcohols commences at 148° C. and the theoretical amount of methanol is distilled off in about 1½ hours; the temperature of the mass is then 240° C. A vacuum of 0.2 mm Hg is applied in 20 min., while the mass is brought to 265° C. The polycondensation is continued for two and a half hours, whereupon the polymer is poured into water.

This polymer serves as control for a second test, carried out under the same conditions but in which 2.5 parts of triethanolamine are added at a temperature of 220° C.; these two polymers have the following properties:

| Test | MV$_1$ (250° C.) | Color |
|---|---|---|
| Control | 1,660 | white, bluish |
| Ex. 6 | 2,200 | white, violet |

EXAMPLE 7

23,280 parts of dimethyl terephthalate, 5,820 parts of dimethyl isophthalate, 15,300 parts of butanediol-1,4 and 6.6 parts of triethanolamine orthotitanate are charged simultaneously into an autoclave. The interchange of the alcohols starts at about 165° C. After two hours and fifteen minutes, the theoretical amount of methanol is distilled off; the temperature of the mass reaches 245° C. 660 parts of a 20% by weight butanediol suspension of TiO$_2$ and 6.6 parts of triethanolamine orthotitanate are then added; the pressure is lowered in forty minutes to 1 mm Hg, while the mass is brought to 260° C. The polycondensation is continued for fifty-five minutes at this temperature. The polymer is then poured.

Another test is carried out in parallel, in which the butane-diol suspension contains, in addition to the titanium oxide and the triethanolamine orthotitanate, also 33 parts of trioctylamine.

The properties of the polymers obtained are as follows:

| Test | MV$_1$ (260° C.) | VI |
|---|---|---|
| Control | 3,400 | 116 |
| Ex. 7 | 3,700 | 120 |

Although the invention has been described in detail for the purpose of illustration, it is to be understood that such detail is solely for that purpose and that changes can be made by those skilled in the art without departing from the spirit and scope of the invention except as it may be limited by the claims.

What is claimed is:

1. In a method of making a heat stable polyester containing only ester units of an aromatic dicarboxylic acid and a glycol having from three to ten carbon atoms by transesterification in the presence of an organic titanium compound catalyst between an alkyl ester of an aromatic dicarboxylic acid and a glycol and then polycondensation of the transesterification product, the improvement which comprises conducting the polycondensation in the presence of an organotitanium compound catalyst and from about 0.001% to 1% by weight, based on the weight of the polyester to be produced of a nonvolatile amine having a boiling point above 200° C. and selected from the group consisting of dibenzylamine, dioctylamine, triethanolamine, trioctylamine, tribenzylamine, and benzyldiethanolamine.

2. The method of claim 1 wherein the diester of an aromatic dicarboxylic acid, a glycol having at least three carbon atoms, and a catalytic amount of an organic titanium compound are mixed together, the mixture is heated until interchange of the glycol with the glycol of the diester, and from about 0.001% to about 1% by weight based on the weight of polymer to be produced of said nonvolatile amine is added to the mixture and the mixture is heated until polycondensation of the resulting diester.

3. The method of claim 1 wherein the diester is dimethyl terephthalate and the glycol is 1,4 butanediol.

4. The method of claim 1 wherein the diester is dimethyl terephthalate and the glycol is 1,6 hexanediol.

5. The polycondensation product of the process of claim 1.

6. A method of polycondensing a polyester which has been prepared by transesterification of dimethyl terephthalate and a glycol having the formula HO—(CH$_2$)$_n$—OH wherein n is a whole number of from three to ten in the presence of an organic titanium compound as the catalyst, said polycondensation comprising
    heating the polyester while molten in the presence of an organic titanium compound catalyst and
    as a heat stabilizer from about 0.001% to 1% by weight based on the weight of the polyester to be produced of a nonvolatile amine having a boiling point above 200° C. and selected from the group consisting of dibenzylamine, dioctylamine, triethanolamine, trioctylamine, tribenzylamine and benzyldiethanolamine.

7. The method of claim 6 wherein the temperature of the polycondensation is between 250° C. and 300° C.

* * * * *